United States Patent [19]
Adair et al.

[11] Patent Number: 5,566,332
[45] Date of Patent: *Oct. 15, 1996

[54] METHOD AND COMBINATION FOR MINIMIZING DATA CONVERSIONS WHEN DATA IS TRANSFERRED BETWEEN A FIRST DATABASE STORING DATA IN A FIRST FORMAT AND A SECOND DATABASE STORING DATA IN A SECOND FORMAT

[75] Inventors: John G. Adair, Austin, Tex.; Daniel J. Coyle, Jr., Los Gatos, Calif.; Robert J. Grafe, Austin, Tex.; Bruce G. Lindsay, San Jose; Roger A. Reinsch, Cupertino, both of Calif.; Robert P. Resch, Byron, Minn.; Patricia G. Selinger; Melvin R. Zimowski, both of San Jose, Calif.

[73] Assignee: International Business Machines Corporation, Armonk, N.Y.

[*] Notice: The term of this patent shall not extend beyond the expiration date of Pat. No. 5,416,917.

[21] Appl. No.: 288,837

[22] Filed: Aug. 11, 1994

Related U.S. Application Data

[63] Continuation of Ser. No. 66,323, May 21, 1993, Pat. No. 5,416,917, which is a continuation of Ser. No. 500,031, Mar. 27, 1990, abandoned.

[51] Int. Cl.⁶ .......................... G06F 17/30; G06F 15/163
[52] U.S. Cl. ................ 395/600; 395/200.12; 395/200.18
[58] Field of Search .................................. 395/600, 500, 395/200.09, 200.12, 200.18

[56] References Cited

U.S. PATENT DOCUMENTS

| | | | |
|---|---|---|---|
| 4,677,552 | 6/1987 | Sibley, Jr. | 364/408 |
| 4,714,995 | 12/1987 | Materna et al. | 395/600 |
| 4,774,655 | 9/1988 | Kollin et al. | 395/600 |
| 5,058,000 | 10/1991 | Cox et al. | 395/600 |
| 5,109,483 | 4/1992 | Baratz et al. | 395/200 |
| 5,278,978 | 1/1994 | Demers et al. | 395/600 |

OTHER PUBLICATIONS

Hu, "Making Ends Meet: Interconnecting Electronic Mail Networks", Data Communications, Sep. 1988, vol. 17, Is. 10 pp. 128–141.

Ruschitzka et al, "Heterogeneous Data Translations Based on Environmental Grammars", IEEE Transactions on Software Engineering, Oct. 1989, vol. 15 Is. 10 pp. 1236–1251.

Mantelman, "Apples and Unix and DOS oh my." Data Communications Feb. 1988; vol. 17 Is 2; pp. 69–77.

Strevell et al., "High Speed Transformation of Primitive Data Types In a Heterogeneous Distributed Computer System," Distributed Computing Systems 1988 Internat. Conf. pp. 41–46.

*Primary Examiner*—Thomas G. Black
*Assistant Examiner*—Jack M. Choules
*Attorney, Agent, or Firm*—Baker, Maxham, Jester & Meador

[57] ABSTRACT

The invention establishes the context in which data exchanged between dissimilar relational database management systems can be mutually understood and preserved, and data conversions can be minimized. The invention accomplishes this by establishing layers of descriptive information which isolate machine characteristics, levels of support software, and user data descriptions. Optimized processing is achieved by processing the different descriptor levels at different times during the development and execution of the database management systems. Minimal descriptive information is exchanged between the cooperating database management systems. Any data conversions that may be necessary are done only by the receiver of the data, and only at the point where it is necessary to have the data represented in the receiver's native format for processing. For sending and receiving systems which match, data conversion is completely avoided, even when the data may have been forwarded through intermediate DBMS systems which do not match. For sending and receiving systems which do not match, data conversion is minimized. The data conversion routines and tables in each system are also minimized by requiring conversion only INTO a system's native format, never FROM its native format into some other format.

19 Claims, 7 Drawing Sheets

FIG. 2a

PS/2 - 437
- MD = INTEGER
- TD = LOW TO HIGH
- MD = FLOAT
- TD = IEEE LOW-HIGH
- MD = CHARACTER
- TD = CODEPAGE 437

FIG. 2b

SYSTEM/370 - 037
- MD = INTEGER
- TD = HIGH TO LOW
- MD = FLOAT
- TD = HEX FLOAT
- MD = CHARACTER
- TD = CODEPAGE 037

FIG. 2c

AS/400 - 037
- MD = CHARACTER
- TD = CODEPAGE 037
- MD = FLOAT
- TD = IEEE FLOAT
- MD = INTEGER
- TD = HIGH TO LOW

FIG. 2d

OTHER - 850
- MD = CHARACTER
- TD = CODEPAGE 850
- MD = INTEGER
- TD = PACKED DEC
- MD = FLOAT
- TD = DECIMAL FLT

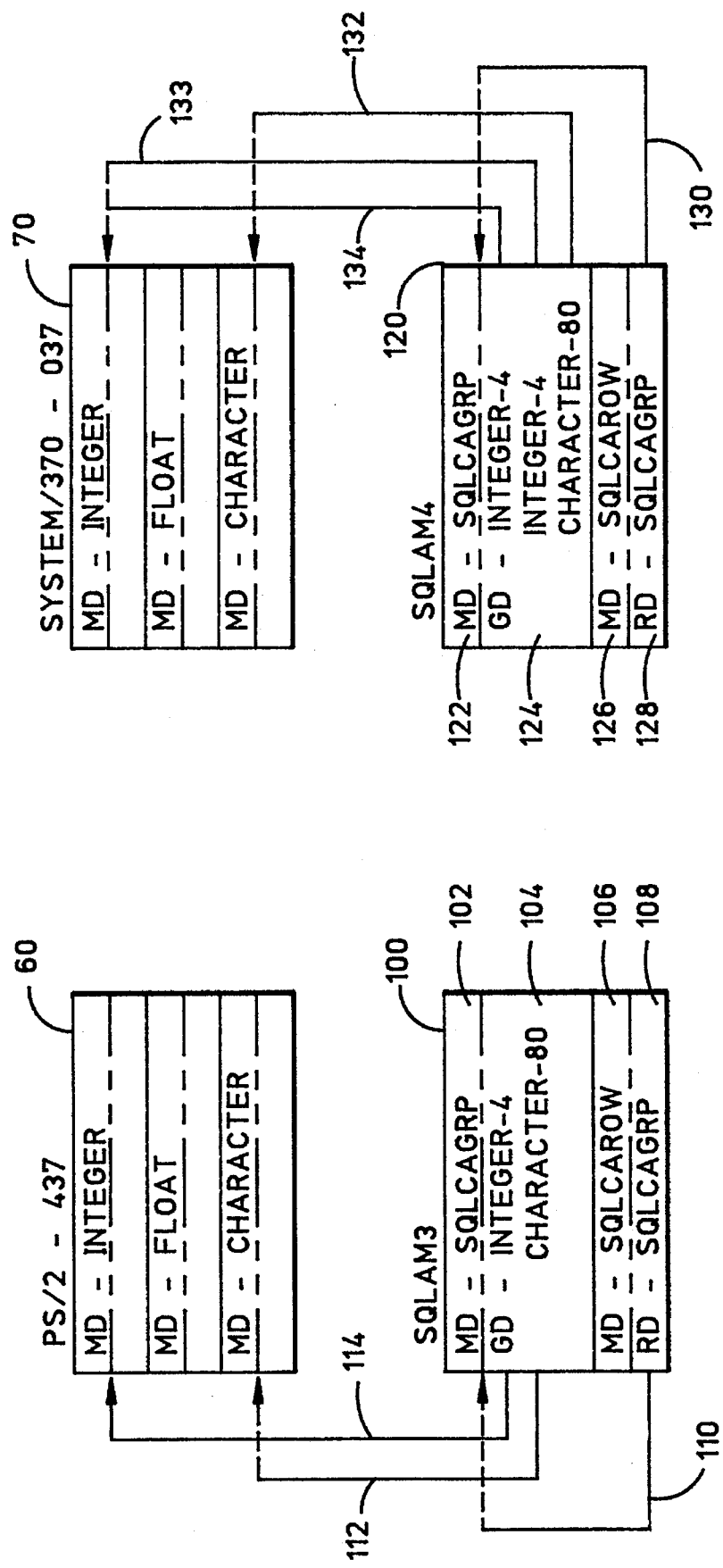

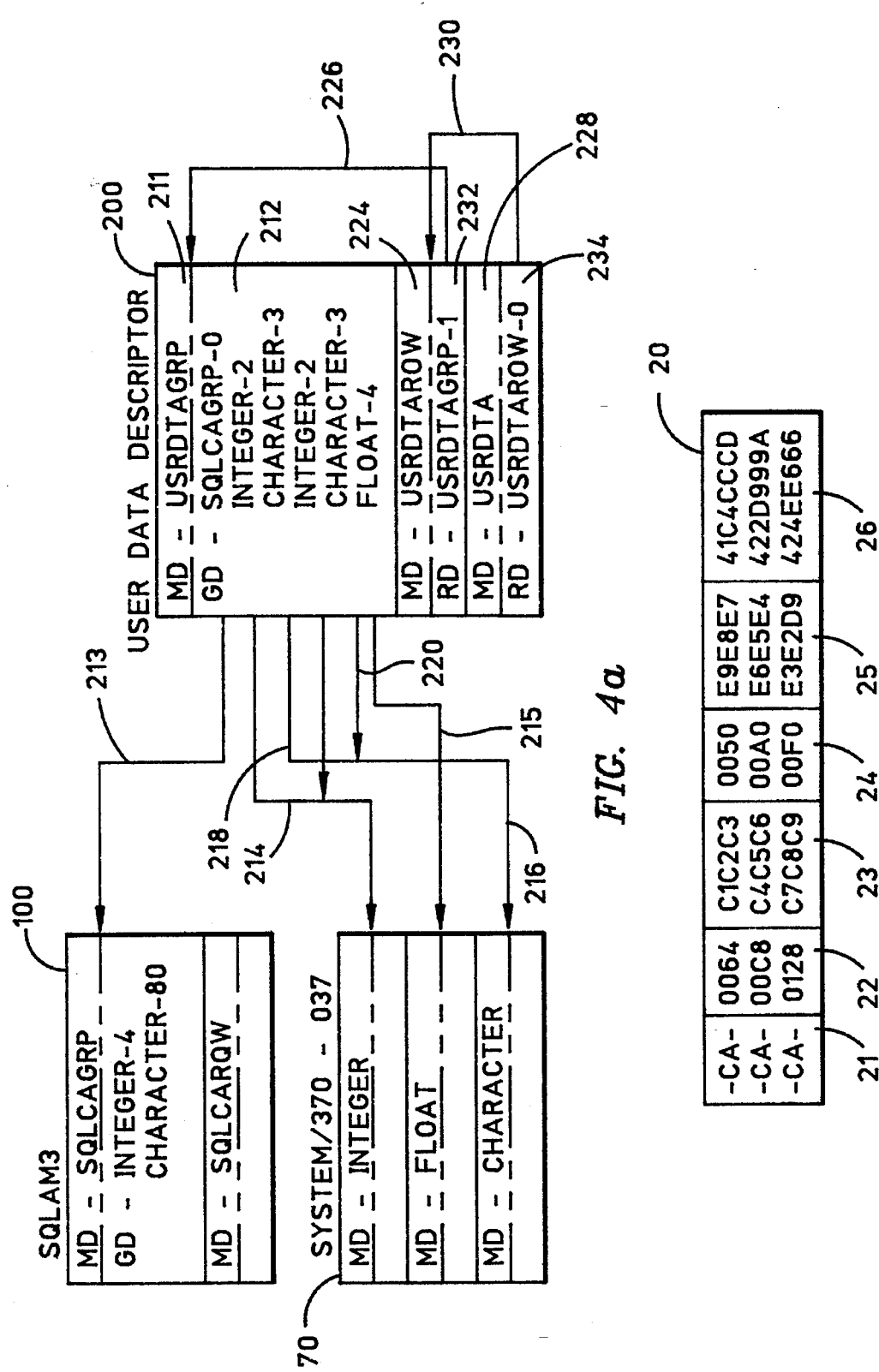

METHOD AND COMBINATION FOR MINIMIZING DATA CONVERSIONS WHEN DATA IS TRANSFERRED BETWEEN A FIRST DATABASE STORING DATA IN A FIRST FORMAT AND A SECOND DATABASE STORING DATA IN A SECOND FORMAT

This application is a continuation of application Ser. No. 08/066,323, filed May 21, 1993, now U.S. Pat. No. 5,416, 917 which is a continuation of Ser. No. 07/500,031 filed Mar. 27, 1990, now abandoned.

CROSS REFERENCE TO PENDING APPLICATIONS

This application includes material which overlaps material in pending U.S. patent application Ser. No. 499,114, filed Mar. 26, 1990, entitled "METHOD AND APPARATUS FOR DESCRIBING DATA TO BE EXCHANGED BETWEEN PROCESSES", inventors: Richard Demers, et al., now U.S. Pat. No. 5,278,978, and U.S. patent application Ser. No. 500,032, filed Mar. 27, 1990, entitled "QUERY LANGUAGE EXECUTION ON HETEROGENEOUS DATABASE SERVERS", inventors: John G. Adair, et al. now, U.S. Pat. No. 5,257,366.

BACKGROUND OF THE INVENTION

1. Technical Field

This invention relates to the characterization and conversion of data for interprocess exchange. More particularly, the invention relates to establishing the context in which data exchanged between dissimilar (heterogeneous) relational database management systems can be mutually understood and preserved, and data conversions minimized.

2. Description of the Prior Art

Currently there is great interest in joining together multiple database management sites to form a distributed system which provides any user at any site with access to data stored at any other site; see for example, AN INTRODUCTION TO DATABASE SYSTEMS, Vol. 1, by C. J. Date (4th Edition, 1986), at pp. 587–622. Date envisions that each site would constitute an entire database system with its own database management system (DBMS), terminals, users, storage, and CPU.

In a distributed database system such as the type described by Date, the DBMS at any site may operate on a machine type which is different than the machine type of another site. Indeed, there may be as many different machine types as sites. For example, the IBM Corporation (Assignee of this patent application) has DBMSs which operate on System/370 machines, AS/400 machines, and PS/2 machines.

The machines upon which the DBMSs of a heterogeneous database system run all represent information in different internal formats. For example, numeric information on PS/2 machines is stored with the bytes in low order to high order sequence. On other machines, such information may be stored in high order to low order sequence. For floating point information, there are IEEE floating point machines and hexadecimal floating point machines. Character information is processed in many different code representations, the choice of which reflects historical or cultural roots.

As DBMSs grow and evolve over time, they may be embodied in a series of versions or releases. Each of these may require additional information to be exchanged in a distributed database system. When these changes are introduced, all sites must be informed.

When a database program is written, compiled and executed entirely in one environment (machine and DBMS), it rarely is sensitive to the exact representation of the data which it processes. The data compiled into the program and the data stored in database structures are all represented identically so the operations behave as expected. Thus, a COMPARE command executed in a single database environment can always be made to manipulate data correctly, just by using the high level language operations of the system.

Thus, given disparity in machine types and the ever-evolving nature of DBMSs, it is inevitable that a distributed database system can be heterogeneous in the sense that any site may manage a database by means of a combination of machine and DBMS which is different from the combination at another site.

Provision is made in the prior art for solving the problems of machine and system incompatibility in a distributed, heterogeneous database system. Three solutions are of interest.

The earliest solution may be termed "application beware". This solution usually starts as a connection between identical database systems which grows over time to incorporate some machines which differ slightly from the original. In these solutions, there is no way for the system to automatically handle the differences, with the result that the application program was given this responsibility. If access to heterogeneous databases was needed badly enough, the application was written to make any necessary accommodations.

The second solution utilizes a canonical representation of data. This approach calls for conversion of data into a single, generic (canonical) representation before transport from one database site to another. Superficially, this solves the problem of automating the system to handle differences between differing databases. However, this approach requires many extra conversions which are inefficient, and introduces many conversion errors, making the approach inaccurate. For example, conversion of a floating point number always requires rounding off, with a concomitant loss of accuracy. When convening from one to another floating point representation, say, from IEEE to hexadecimal, precision is lost. In changing from hexadecimal to IEEE, scale is lost. Where character translations are performed, many of the special characters are lost because of lack of equivalence between character codes. In this solution, conversion errors which do occur are introduced at a point in the process far removed from the application. This increases the difficulty of identifying and responding to errors.

The last solution employs a gateway conversion in which a central facility is responsible for matching any database representation to any other. Ideally this reduces the inefficiency, inaccuracy, and error propensity of the canonical representation since conversions call be avoided when they aren't needed. However, inter site communication is lengthy, slow, and expensive. The gateway is a single mode to which all inter-site paths connect for all interactions. Instead of a request and response between the two participating sites, there are two requests and two responses for every data transfer. When conversions are required, they are still done in a part of the distributed system which is remote from the application.

Thus, there is an evident need in distributed, heterogeneous database systems to support effective and accurate exchange of data, while reducing the number of conversions, and the communications overhead. It is also desirable to perform any needed conversion at the site where the data to be converted will be processed.

SUMMARY OF THE INVENTION

This invention describes a method and system for establishing the context in which data exchanged between heterogeneous relational DBMSs can be mutually understood and preserved, and data conversions minimized. Particularly, a sequence of information transfer is described which enables a database to request or receive data expressed in a non-native form. Thus, with the practice of this invention, a DBMS may receive data in a foreign format and itself perform the necessary conversion of the data.

To minimize the number of conversions, a method is provided whereby no data is converted until it is needed in a specific format for processing. This method allows each system to always send all data in its preferred (native) format, or the current format of the data if the data is just passing through an intermediate system without being processed. When data is received, it is converted to the native format of the system only when it has reached its final destination (in being passed to the application, or stored in the database), or when it actually needs to be processed by an intermediate system.

According to the invention, a database in a distributed, heterogeneous database system contains predefined descriptions of all machine environments in the system (machine descriptors) and predefined descriptions of database language structures (system descriptors) for each DBMS with which it can perform data exchange. When a database operation begins which requires two heterogeneous databases to conduct an information exchange, a communication link is established between them. Next, each DBMS identifies its machine and system descriptors to the other. This establishes a data context and is done only once for the life of the communication link. Once established, requests, responses and data can be sent or received. When any data is sent, it is sent in the native format of the sender. Specific descriptions of the data precede the data itself and refer to the machine and system descriptors earlier identified. When the data is received, information contained in the specific descriptions enable these descriptions to be referenced to the machine and language descriptors and passed off to a conversion process in the receiver. Taken together, the specific descriptions, and the machine and system descriptors which they reference, precisely characterize the environment where the data originated and establish, at the receiver, a context for accurate conversion of the data into a format which is native to the machine/system combination of the receiving site.

The invention reduces the total overhead required in making and responding to a data request by eliminating unnecessary data conversions, thus increasing the speed with which a request for data is serviced. It also minimizes the necessary conversion routines needed in each system by requiring conversion only INTO a system's native format, and never FROM its native format into some other format.

BRIEF DESCRIPTION OF THE DRAWINGS

FIGS. 2A, 2B, 2C and 2D illustrate machine descriptors.

FIGS. 3A and 3B illustrate system descriptors together with their references to machine descriptors.

FIGS. 4A and 4B illustrate user data descriptors of the invention with references to machine and system descriptors.

DESCRIPTION OF THE PREFERRED EMBODIMENT

Figures 1A, 1B:
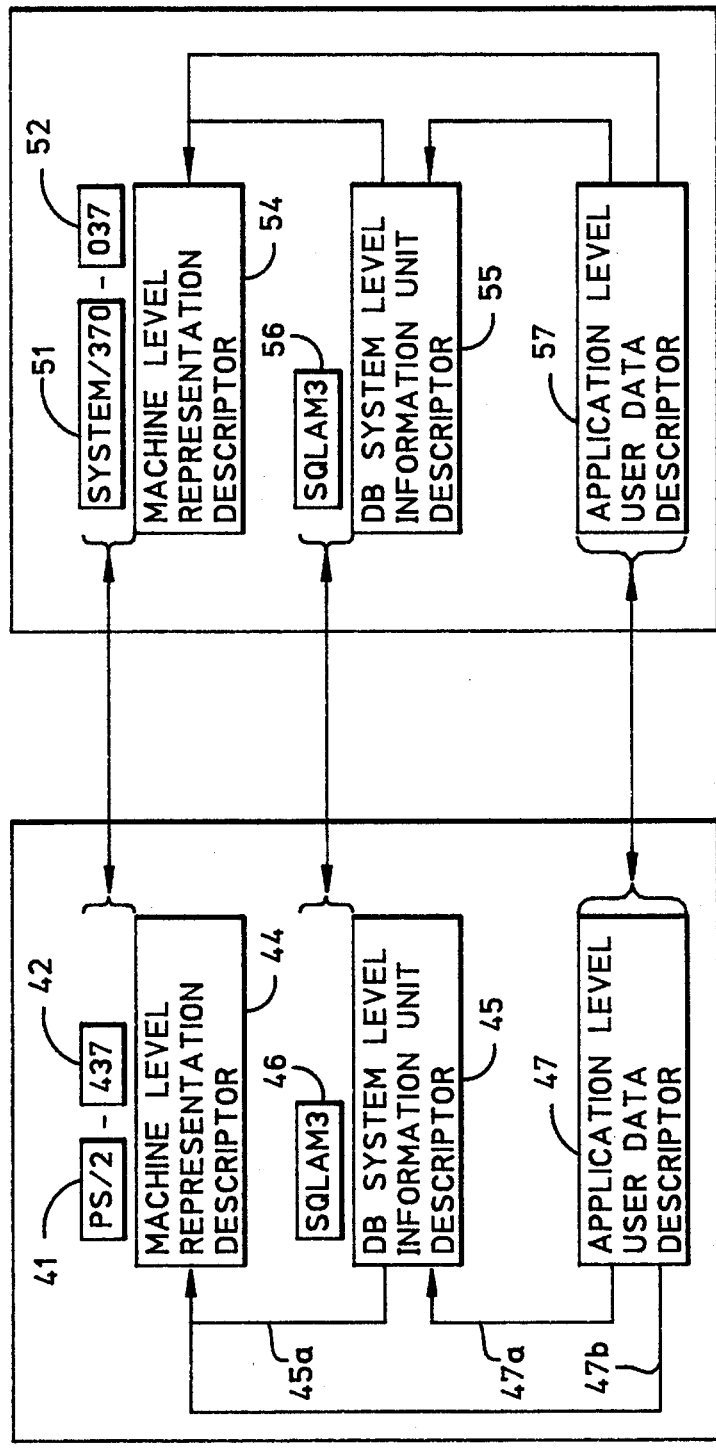
FIG. 1A is an illustration of user data which is to be transferred between non-equivalent database systems.
FIG. 1B is a top level representation of the relationships of all descriptors which define the environmental context of the user data illustrated in FIG. 1A.

When used herein, the term "descriptor" means a unit of data used to characterize or categorize information. The term "data object" is taken to mean a data structure element that is necessary for the execution of a program and that is named or otherwise specified by a program. A "reference" is a construct such as a pointer which designates a declared object. Descriptors, data objects, and references are all understood in the context of a programming language. In relational DBMSs, a well-known relational language is SQL.

An "environmental context" is an information set which describes the database system which originates a block of user data. Data is in "native form" if it is made tap of data types and control information in a form used by the database system which is processing it; otherwise, it is "non-native" or "foreign". A database system "environment" is the set of logical and physical resources used to support database management.

For relational database systems, the SQL language describes several different data types. These types include INTEGER, FLOAT, VARCHAR, and many more. Depending on the machine on which an SQL database manager is implemented, the actual bit representations for data values having SQL data types vary. For example, the IBM System/370 employs a hexadecimal floating point representation, the IBM AS/400 employs the IEEE format, and on IBM's OS/2 machines, IEEE byte reversed formats are used. These differences are implied by the machine environment and are not formally exposed to application programs executing in the environments.

Furthermore, there are many SQL identified standard control blocks, such as the SQL communication area (SQLCA) which is defined in terms of SQL types. The SQLCAs in the machine environments defined above are not identical. This invention formalizes a method and means for exchanging information between heterogeneous DBMSs about machine characteristics and DBMS language structures such that little or no descriptive information must be exchanged at run-time in order to convert data to a native form. Additionally, when database sites match, even though the data may have been forwarded through intermediate DBMS systems which do not match, no conversions are performed at all, thus preserving completely the integrity of the data being exchanged. When these sites do not match, data conversions are performed close to the ultimate point of use where errors introduced by imperfect conversions can be dealt with according to the needs of the requesting application.

This invention is described using simple machines, database management systems, and user data. Those skilled in the art skilled in the art will understand that detailed implementations will require support for many more generic data types than are described hereinbelow, many more DBMS information blocks, and user data with many more fields. The extensions to handle these cases are manifest and would only serve to unnecessarily obscure the invention if presented herein.

FIG. 1A illustrates user data in hexadecimal format. The data are shown in two forms, 10 and 20. The user data 10 appears as it would in a typical personal computer environment. The data 20 has the same meaning as the data 10 except that it appears in the form it would have in a typical mainframe environment.

The user data forms illustrated in FIG. 1A form the example upon which explanation of the invention is based. When the user data is to be sent from the personal computer environment to the mainframe environment as illustrated by the direction 31–30, it must be changed in form from 10 to 20. Conversely, if the user data is to be sent from the mainframe to the personal computer environment, that is, direction 30–31, it must be changed in form from 20 to 10.

The actual data being transferred consists of three rows. Each row is an entity containing all of the fields necessary to describe the outcome of an SQL statement. With reference to the rows in each user data, the first fields 11 and 21 are SQL communication areas which describe the outcome of an SQL statement. In this regard the SQL statement is assumed to be a command in the SQL language which results in the manipulation of data in a database. In the example, the data affected by the outcome of the SQL statement consists of five fields. In the first row, the first fields 12 and 22 contain the integer value 100, the second fields 13 and 23 contain the character value "ABC", the third fields 14 and 24 contain the integer value 80, the fourth fields 15 and 25 hold the character value "ZYX", and the last fields 16 and 26 contain the floating point value 12.3.

The second row of each representation in FIG. 1A consists of an SQL communication area followed by the integer value 200, "DEF", the integer value 160, the characters "WVU", and the floating point value 45.6. Similarly, the third row includes an SQL communication area, integer 300, characters "GHI", integer 240, characters "TSR", and floating point 78.9.

It will be appreciated that the integers in the user data 10 are in low to high sequence, and in high to low sequence in the user data 20. Characters are coded in ASCII in the personal computer user data and in EBCDIC in the mainframe user data. Floating point is IEEE low to high in fields 16 of the user data and hexadecimal excess-64 in fields 26 of the user data 20. The communication areas 11 in the personal computer machine use formats which are different than the SQL communication areas 21 in the mainframe environment.

No distinction has yet been made as to which direction the data in FIG. 1A will be transferred. That is, no statement has been made as to which environment is the server and which the receiver of data. The method of this invention is completely symmetric and reversible. However, for the purpose of explanation, assume that a request for user data is made by a personal computer DBMS, that a mainframe DBMS server receives the request, obtains the user data locally, and sends the user data, which is received by the requesting machine. Relatedly, in FIG. 1A, the requested data is user data 20 which must be rendered ultimately into the form represented by user data 10. The invention provides for establishing a context by which the receiver can accept user data 20 and prepare for conversion of that data into the format represented by user data 10. This invention does not concern the actual conversion process itself, but rather with a method and means for delaying conversion until the data reaches the location where it is to be processed.

In FIG. 1B, there is illustrated a personal computer machine environment 40 ("receives") and a mainframe machine environment 50 ("server"). The personal computer environment can include, for example, the IBM PS/2 product programmed with an OS/2 SQL-based database management system. For convenience, the machine name of the personal computer 40 is indicated by reference numeral 41. The DBMS which runs on the machine 40 utilizes a code to represent characters and control function meanings. For this purpose, a code page maps all code points to the graphic characters and control function meanings utilized by the DBMS. The code page is represented by reference number 42. The DBMS is a language-based system, and in the example, it is assumed that the DBMS is an SQL-based system. Further, it is assumed that the version or level of the language is SQLAM3. This is denoted by reference numeral 46 in FIG. 1B.

A complete characterization of the personal computer environment which processes user data 10 therefore must include an indication of the type of machine which processes the data, representation of machine-level information such as the data types which exist in the machine, and information showing in what form the data exists in the machine. In the example of FIG. 1A, the data types are integers, floating point numbers, and character strings. In the personal computer, integers are represented in low to high sequence, characters are in ASCII, and floating point is IEEE low to high. All of this information is represented in the invention by a machine-level representation descriptor. In FIG. 1B, the machine-level representation descriptor for the personal computer machine is indicated by reference numeral 44.

The context for conversion also requires information describing characteristics of the language in which the DBMS sending the information is written. In this description it is assumed that all of the DBMS sites are written in one or another version of an SQL-based language. In order to accommodate non-identical representations of control information produced by these varying versions, a system level language characteristic descriptor must be available to the converting machine in order to convert the language-specific portions of the user data. In FIG. 1A, the language-specific portions are the communication areas. In order to provide this system-level information about the language characteristics, the converting machine is provided a system-level information unit descriptor. In FIG. 1B, the system-level descriptor for the personal computer language environment is indicated by reference numeral 45.

The context is completed by the provision of application level information specific to the user data being transferred. This information is given in the form of an application level user data descriptor. For the personal computer machine environment, this descriptor is indicated by reference numeral 47. The application level descriptor includes a control block for conveying information between cooperating DBMSs. This descriptor is in the form of a prefix appended to the user data which is sent to the receiver. This prefix contains information setting forth the machine and system-level characteristics of the transferred data. The system-level information provides a reference to the system-level information in the system-level descriptor corresponding to the language version of the serving system, as well as a reference to the machine-level information in the machine-level descriptor representing the serving machine. In FIG. 1B, reference numeral 47a represents the system-level reference made in the application level descriptor 47, while reference numeral 47b indicates the machine-level reference made in the descriptor. As FIG. 1B illustrates, reference is also made by the system-level descriptor to the machine-level descriptor. In FIG. 1B, the reference numeral 45a represents the machine-level reference made in the descriptor 45.

It should be evident that a user data context can be conveyed in whole each time user data is sent to a receiver by appending machine, system, and application level descriptors to the data. Appropriately, this would be employed in an asynchronous communication environment. In a synchronous communication environment, context could be completely conveyed by transfer of machine and system-level descriptors initially, followed by transmission of application level descriptors and binding of the received application level descriptors to the machine and system descriptors at the receiver's site. In either case, the machine and system-level descriptors would have to be transferred, in whole, at least once between the sites. This transfer is not required in this invention.

Thus, in FIG. 1B, assuming that the mainframe machine 50 is sending data, its machine-level and system-level descriptors 54 and 55 must be made available to the requesting personal computer machine 40 and linked to application level descriptors 57 in order to convert the user data of FIG. 1A from the representation 20 to the representation 10. Relatedly, the descriptors 54, 55 and 57 must be made available to the machine 40. Similarly, for data transferred in the opposite direction, that is, from the personal computer machine 40 to the mainframe machine 50, the descriptors 44, 45 and 47 would have to be made available to the mainframe machine 50 in order to convert user data 10 into the form of user data 20 in FIG. 1A.

In the practice of this invention, it is asserted that, during the implementation of each DBMS site which participates in a distributed, heterogeneous database system, a decision is made as to which specific machine representations will be supported at the site. It is asserted that the "native" representation of the machine on which the site's DBMS will run is supported. That is, if data from another DBMS identical to the receiving site's DBMS is received, the representation is "native" and requires no conversion. Additionally, other machine types will be supported as partners. Generally, the "non-native" representations of data types will be converted to "native" ones at the receiving site before processing. In the preferred embodiment, at each site, there is maintained a list of acceptable machine partner types at each site. Thus, at the site of the personal computer machine 40, a list of acceptable machine types includes the machine and code page corresponding to identifiers 51 and 52 in the machine 50. The list indexes to a set of descriptors which include the machine-level and system-level descriptors for all acceptable system partners. Thus, if the personal computer machine 40 receives simply identification of the machine and language present at the site 50, these identifications can be brought to the list which will index to the necessary descriptors in the list of descriptors, the indexed descriptors corresponding to the descriptors 54 and 55.

Therefore, when the personal computer 40 generates a request for data from the DBMS running on the machine 50, the receiver machine 40 sends its machine and system-level name (PS/2, 437, SQLAM3) to the system to which connection is desired, in this case, the machine 50. If the machine 50 finds these names unacceptable (not in its list) then an error is returned to the receiver and the connection is broken. If the names are acceptable to the machine 50, the machine 50 assumes the status of server and completes connection by sending its machine and system-level names to the receiving machine 40. If these names are acceptable to the receiver, then the connection is established. Otherwise the connection is broken.

Having established the connection, the receiver sends a data request to the provider/server machine 50. The provider/server constructs a user data descriptor 57 according to the characteristics of the data requested, in this case according to the characteristics of user data 20 in FIG. 1A. In this case, the descriptor is built to reflect the presence or the SQL communication area 21 and the five user data fields 22, 23, 24, 25, and 26. The provider/server machine 50 then sends the descriptor 57 and the user data 20 to the receiver machine 40.

Upon receipt, the receiver uses the descriptors obtained in response to the machine and system-level identifier sent by the machine 50 and the references contained in the application level descriptor 57 to convert the user data 20 from the server's representations to the receiver's representations for subsequent processing.

It should be appreciated that the identifiers exchanged between the machine and the user data descriptor must be in a canonical form which is understood by both systems. In the preferred embodiment, this form is defined by a particular code page in EBCDIC. With this common basis for understanding, each site in the distributed system will recognize the identifiers and user data descriptors of any other site.

Refer now to FIGS. 2A–2D for an understanding of the structure and contents of machine-level representation descriptors according to the invention. The descriptors for four machine types are illustrated. The descriptor 60 represents a machine exemplified by an IBM PS/2 executing a DBMS which uses code page 437 for character coding. The descriptor 70 characterizes a mainframe machine of the System/370 type whose DBMS uses code page 037. The descriptor 80 is for an AS/400 machine using code page 037. The descriptor 90 is for an hypothetical machine called OTHER using code page 850 for character encoding. The descriptors in these figures represent the machines in very simplified terms. The representations correspond to generic data types which are recognized and used by all database sites in a distributed system. In the figures, the data types are INTEGER for integer numbers, FLOAT for floating point numbers, and CHARACTER for non-numeric information, such as letters of an alphabet. Each generic data type is also described in terms of a format which is particular to the machine whose descriptor is illustrated.

The machine-level descriptors of FIGS. 2A–2D are shown as multi-field data objects, with the fields containing information relating to a generic data type or a data type format. Thus, detailed specifications of the INTEGER data type are contained in multi-field sections 62, 72, 82, and 92 of the machine-level descriptors. Detailed specifications of the representation of floating point numbers for these machines are contained in sections 64, 74, 84, and 94 of the descriptors. Character representations specifications are contained in sections 66, 76, 86, and 96 of the descriptors.

In the illustrated descriptors, each generic data type is identified initially by a marker definition (MD). For integers, the markers are in fields 67, 77, 87, and 97 of the descriptors. The markers for each generic type are identical in each machine descriptor set. They identify unambiguously the generic type of the representation which follows. Each MD is followed a type definition (TD). The type definition shows exactly, to the bit, how the data is represented in the machine identified by the descriptor. Taking integers as an example, the four TDs shown have three different bit representations. Two machines represent, in fields 88 and 78, that integers are binary values with the bytes ordered from high to low significance. One machine uses binary values, but reverses the order of the bytes, storing the low order byte first, as indicated in field 68 of the descriptor 60. The machine represented by the descriptor 90 represents integers in decimal digits in a packed format as indicated by field 98. The TDs shown are not all the same. However, the TDs which are the same mean exactly the same thing and are represented in exactly the same way among the descriptors. Thus, for example, integer high-to-low in fields 78 and 88 of descriptors 70 and 80 is exactly one representation.

In the invention, the MD-TD pairs can each represent a family of types. Integers of length 1, 2, 3, 4 . . . bytes all can share the same descriptor. Similarly, for characters the actual code page to be associated with the type is a separate parameter. The code page specified in the TDs 69, 79, 89, 99 is a default which can be overridden. This is explained below with reference to FIGS. 3A and 3B.

The significance of a TD is not limited to association with a single generic data type. Thus, the same TD may be used as the representation for several different generic data types or MDs. For example, if there were a generic type called WEIGHT, it could be represented by floating point or integer numbers. It may be the case that different machines would support it differently. Such variation is supported fully by this invention. Thus, a generic data type is named specifically by the MD; how the data type is represented is specified by the TD.

One additional feature that will be evident to the ordinarily skilled practitioner is that the order of the generic type specifications (MD-TD pairs) is not important to the significance of the machine-level descriptors. The meaning set by the MD is used to establish linkage to an appropriate TD from a higher level descriptor, such as a system-level descriptor.

FIGS. 3A and 3B illustrate the structure and contents of system-level descriptors and how those descriptors are referenced to machine-level descriptors. In FIGS. 3A and 3B, the system-level descriptors illustrate two different levels of language support. In this regard, the descriptor 100 of FIG. 3A is for a level called SQLAM3 while the descriptor 120 of FIG. 3B is for a level called SQLAM4.

The system-level descriptor for an SQL information block which includes status of the SQL calls, the SQLCA, consists of markers (MDs), grouping descriptors (GDs), and row descriptors (RDs). Consider now the two system-level descriptors 100 and 120. In these descriptors, the first markers, 102 and 122, respectively, identify groups of fields which are to be included in the SQL communication area. These markers give generic meaning to the group of fields which follows, and are the same at all levels of DBMS implementation. In each descriptor, the group marker is identified as SQLCAGRP.

In the system-level descriptors, the group markers are followed by grouping descriptors (GD) 104 and 124, which indicate exactly which fields should be included in the SQL communication areas for user data.

A grouping descriptor has the property that members of its described group are ordered but not yet arrayed into a linear vector of fields.

Another property of grouping descriptors can be appreciated with reference to FIG. 3A where the grouping descriptor 104 includes machine-level references, in this case, Integer-4 and Character-80. These members of the indicated group are references to data types identified by marker definitions in machine-level descriptors. As FIG. 3A shows, these references provide reference directly to the integer and character MDs of the machine-level descriptor 60 (which is identical with the descriptor of FIG. 2A). The references are indicated by bindings 112 and 114. In the invention, the value specified in a reference is used to override the default length built into the machine descriptor. Thus, reference 114 in FIG. 3A overrides the machine length of its respective integer representation in the machine-level descriptor 60 to four bytes. In FIG. 3B, references 133 and 134 also override the machine length to four bytes for integers.

In FIG. 3B, the system-level descriptor 120 denotes one more field in the SQL communication area than the previous system-level descriptor 100 for SQLAM3. One more value therefore is returned to status in a CA of user data at this higher level. It is contemplated in the practice of the invention that, during connection processing, both the requesting and receiving DBMS tells the other what to expect. Preferably, the systems agree to operate at the same system descriptor level, and agree to the lower one.

The group description, 104 in FIG. 3A and 124 in FIG. 3B, is followed by another marker, 106 in FIG. 3A and 126 in FIG. 3B. These markers indicate that a row description for an SQL communication area is following. In each case, the row descriptor references the group described earlier, 110 in FIG. 3A and 130 in FIG. 3B. This vectorizes all of the fields and completes the definition of information which can be exchanged. In this row form, the SQL communication area can be exchanged on commands which do not involve user data, but which do involve system status information.

The row descriptors 108 and 128 are identical in both levels; they refer to groups which contain differing information (104 and 124), which, in turn, reference different machine descriptors 60 and 70. The row descriptors therefore make an actual block dependent on a language level or version, and make the block specific with regard to an identified machine, as well.

The system-level descriptor blocks illustrated in FIGS. 3A and 3B of either level can map onto any of the machine descriptors, independent of the order of the descriptors in the machine. The reference is to the MD entries in the machine descriptors. The generic type of field in the SQL communication area is linked to the representation of that genetic type in the machine-level descriptor. As thus described, a system-level descriptor can provide a machine-independent way to specify the contents of blocks of information to be exchanged between DBMSs. They provide both group descriptions (which will be used by higher-level descriptors) and row descriptors which describe complete objects which may be exchanged. The row descriptors included in the system-level descriptor can be referenced by another row descriptor to produce an array. This is illustrated and discussed below with reference to FIG. 4. The system-level descriptors are established early in the implementation of a DBMS and assembled into a set. The set required for any level of implementation can be given a name which any other implementation will understand. In this regard, the name of the system-level descriptor 100 in FIG. 3A is "SQLAM3". In FIG. 3B, the name of the descriptor 120 is "SQLAM4". In the practice of the invention, it is these names alone which are exchanged when a communication connection is made, thereby obviating the need to exchange the descriptors themselves.

Refer now to FIG. 4 for an understanding of the structure and content of a user data descriptor and how its linkages with machine- and system-level descriptors provide a complete context which enables a receiver DBMS to understand and convert user data from non-native to native form. The user data descriptor 200 provides a system-level and machine-level-independent way to describe user data. It is contemplated that this descriptor would not be built until run time, since, particulars of user data aren't known until after installation of a DBMS and creation and population of the relational tables in the DBMS, and until receipt of a particular request for data.

The user data descriptor 200, like the system- and machine-level descriptors discussed previously, consists of markers and other descriptors. A first marker MD 211 tags a group 212 consisting of an SQL communication area reference 213 to the system-level descriptor 100, and five references 213, 214, 215, 216, and 218 to the machine-level descriptor 70. These six references correspond to the six fields which make up a respective row of user data 20, which is reproduced for convenience in FIG. 4B. Thus, the group 212 identifies the fields within a row of the user data, field by field, tells what generic type of data is in each field, and specifics the size of the data. For example, the group 212 has a first reference SQLCAGRP-0 which indicates that the first field in a row of user data will consist of an SQL communication area. As shown in FIG. 4B, a communication area "CA" is in the first field 21 of each row of the user data 20. Similarly, the second field, field 22, in a user data row is a two-byte integer, the third field, field 23 is a three-byte character, the fourth field, field 24 is a two-byte integer, the fifth field, field 25 is a three-byte character, while the last field, field 26 is a four-byte floating point number.

The six references, 213, 214, 215, 216, 218, and 220 result in a group with seven fields, two from the system-level descriptor (Integer-4 and Character-80) and five from the user dam. All of these references are independent of a particular language level and a specific machine. It is true that the described data is very much dependent on these descriptive levels, but the key of this invention is that the description of the data is not.

Returning to the explanation of the user data descriptor 200 in FIG. 4A, the next MD marker 224 tags a RD row descriptor with a reference 226 to the marker 211. This reference is used to define a row of elements in the row of user data. As explained above, such a row would include seven fields, the two fields of the SQL communication area followed by the five user data fields, in order. This completely enumerates the fields for one object which can be exchanged between heterogeneous DBMSs. It includes information in the communication area as to the status related to the request which fetched the data, along with the data. MD 224 is followed by an RD 232 with a modifier "1", which indicates that one copy of each element of the defined group should be included in the final row.

The final MD 228 tags an RD 234 with a reference 230 to the row descriptor 232. This descriptor is used to make an array or table of the set of rows comprising the user data 20 of FIG. 4B. The modifier "0" in the RD 234 indicates that the referenced row should be repeated as many times as necessary to include all the data which follows. This is of significant importance in queries since it is seldom possible to predict the final number of rows in an answer set before sending the first one (and the user data descriptor) to the receiver.

In summary, the user data descriptor provides a mode of describing data which is independent of the system-level and machine-level artifacts in the described data. The data described includes DBMS status information and the user data proper. The user data descriptor thus accommodates the definition of any data which a user can retrieve front (or send to) a DBMS. When the user data descriptor is bound to both a system-level descriptor and a machine-level descriptor, actual data can be understood in physical terms. Thus, the references (bindings) to the machine level descriptor 70 and system-level descriptor 100 give physical meaning to the referencing members of the group 212. It is asserted that these references can be implemented conventionally by standard binding techniques.

Figure 5:
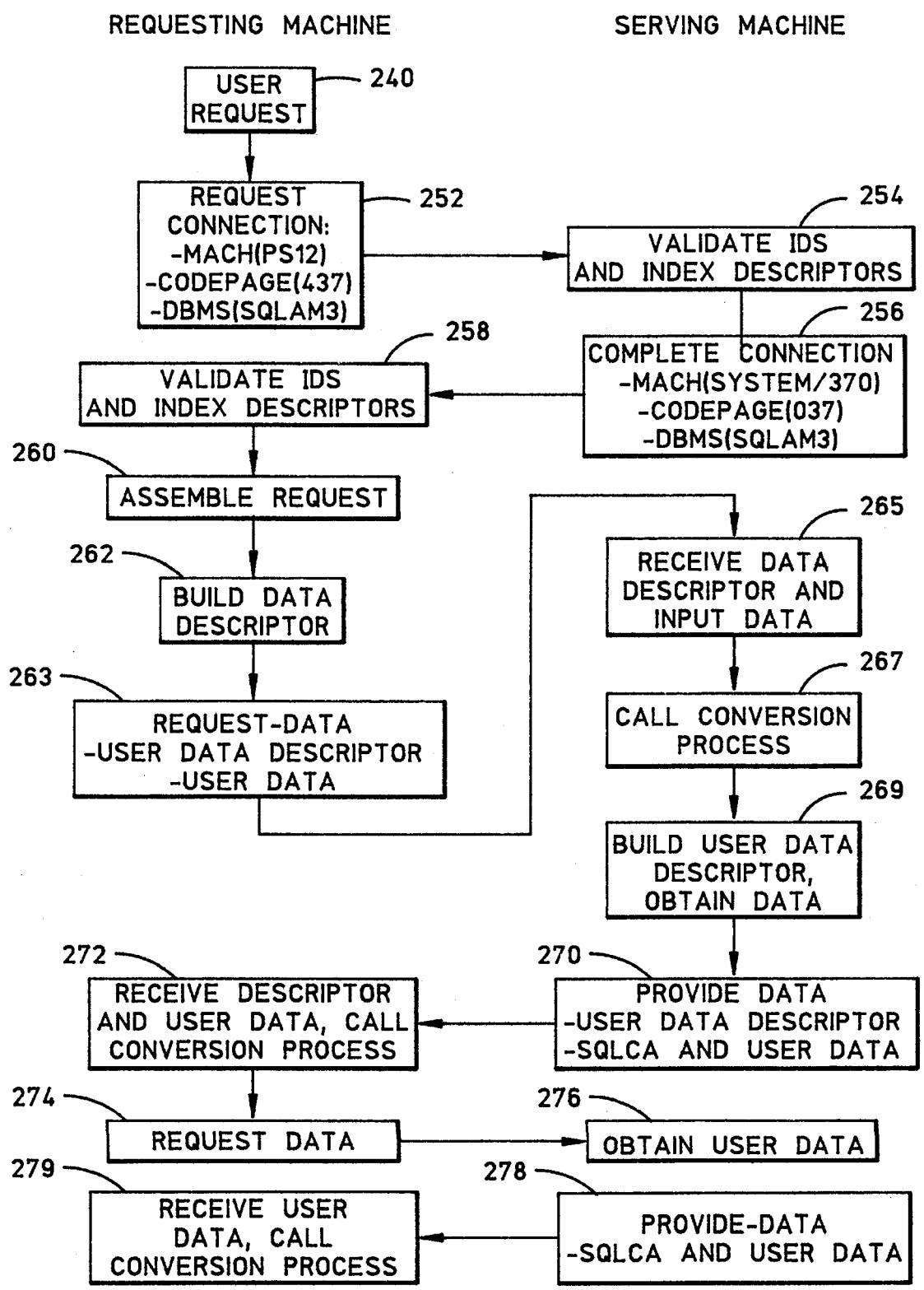
FIG 5 illustrates the procedure of the invention in the example of command and data flows to set up and request a set of user data between a requesting and serving machine.

FIG. 5 illustrates a procedure for establishing a conversion context using the data objects whose structures and functions have been described above. The procedure includes generic commands for requesting and completing a communication connection and for requesting and providing data. The procedure of FIG. 5 is illustrated as a simplified sequence which shows only the parameters which must, of necessity, be exchanged for transferring data between requesting and serving machines and establishing the translation context in the receiving machine for conversion of the data. It is reiterated that the procedure of the invention is not concerned with how data is converted, but rather with where the data is converted. Particularly, the invention enables the receiver of the data to convert the data for establishing particular values for those parameters.

The structure of FIG. 5 places all of the requesting machine actions in the left-hand side of the drawing and all of the serving machine actions in the right-hand side. Thus, in step 240 a user at the requesting machine first issues a request for data which is maintained by a DBMS in the serving machine. Next, in step 252 the requesting machine executes a REQUEST-CONNECTION command sequence directed to the serving machine. The REQUEST-CONNECTION sequence includes parameters to identify the requesting machine, its character code, and its language level. In the example, the requesting machine is identified as a DBMS executing on a PS/2 personal computer, utilizing a specific code page (437) for character coding, and operating at a specific DBMS language level (SQLAM3). The parameters in the REQUEST-CONNECTION step are no more than identifiers. Next, in step 254 the serving machine receives the connection request, validates the machine- and system-level identifiers, and uses these identifications to index to machine- and system-level descriptors. Assuming that the serving machine recognizes and possesses the machine- and system-level descriptors identified in the connection request, it executes a COMPLETE-CONNECTION in step 256 including parameters which provide machine- and system-level identification to the requesting machine. In step 258, the COMPLETE-CONNECTION response received from the serving machine is validated in the requesting machine and the identifiers are used to index the appropriate the machine- and system-level descriptors. For example, in the example of FIG. 5, the requesting machine would index to the machine and system descriptors 70 and 100 illustrated in FIG. 2B, 3B, and 4A. Next, in step 260, the requesting machine assembles a data request and sends it in step 263 as a REQUEST-DATA command to the serving machine. This REQUEST_DATA optionally includes an input data descriptor (built in step 260) with optional input data, if appropriate for the SQL to be executed. In step 265, the serving machine receives the REQUEST-DATA command, including optional input data and descriptor. If input data is present, a conversion process is called in step 267. The serving machine responds to the REQUEST_DATA command in step 269 by obtaining the requested user data and building a user data descriptor such as the descriptor 200 illustrated in FIG. 4A, and executes a PROVIDE-DATA command in step 270 by sending the user-data descriptor and the user data as, for example, the first row in the user data 20 in FIGS. 1B and 4B. The requesting machine then, in step 272, receives the transmitted descriptor and user data and calls a conversion process to convert the data. According to the needs of a particular implementation, the bindings between the user data descriptor and the indexed machine and system descriptors can be done in step 272 or left for the called conversion process. In step 274, a second REQUEST-DATA command is sent, its parameters are processed, with the server, in step 276, obtaining and returning the requested user data with another PROVIDE_DATA command (step 278). The requesting machine again, in step 279, processes the data according to the user data descriptor received with the first PROVIDE_DATA command, and to the system level, machine type, and code page values received during the connection portion of the process. Now if the receiver requires more data, it issues another REQUEST-DATA command, with the server returning the data with another PROVIDE-DATA command, and so on.

Figure 6:
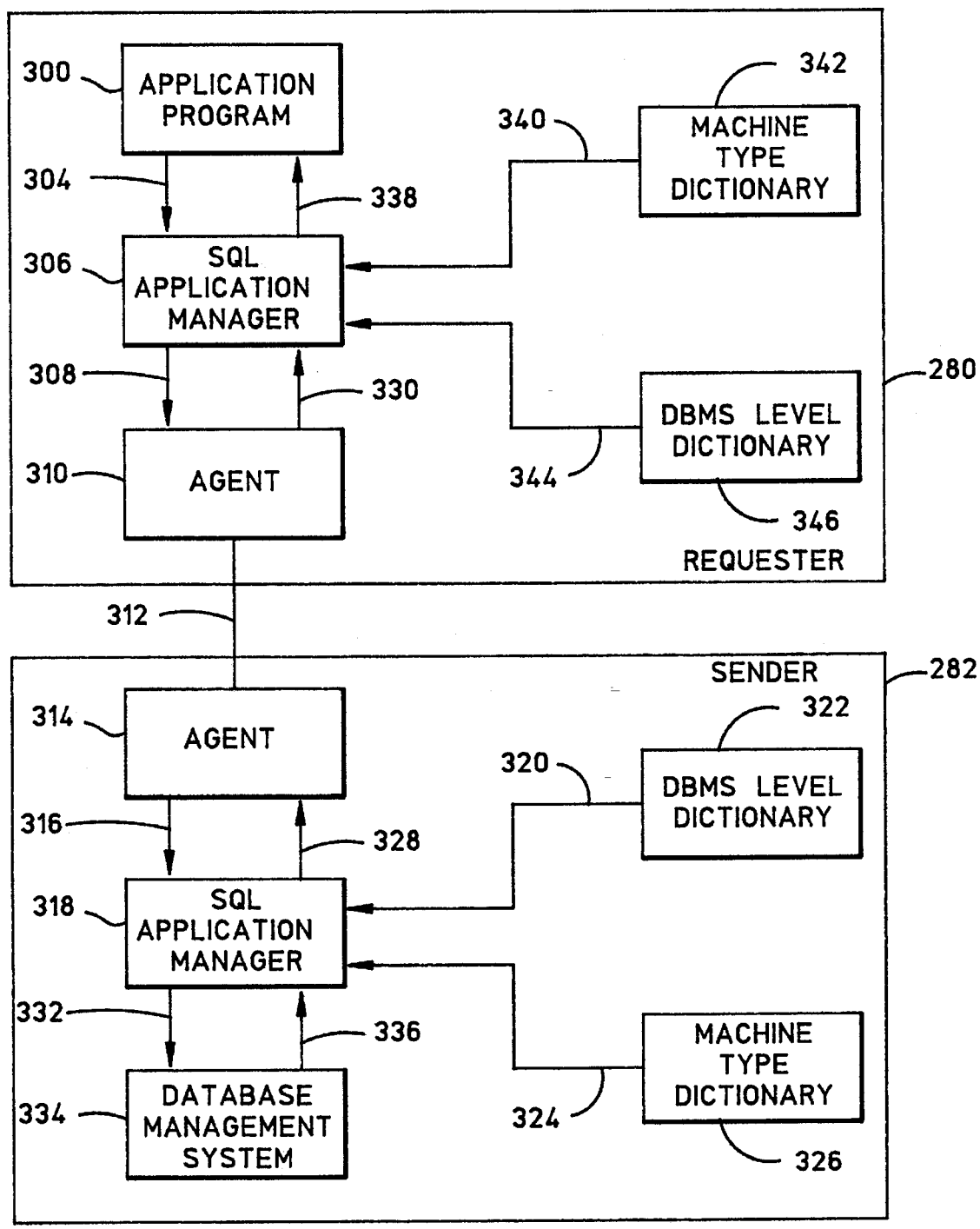
FIG. 6 illustrates a representative system architecture on which the invention may be practiced.

An architecture for implementing the procedure of FIG. 5 is illustrated in FIG. 6. In FIG. 6, the requesting machine is assumed to be, as set out above, a PS/2 personal computer, while the server is assumed to be a mainframe of a System/370 type. The requester is identified by reference numeral 280, the server by 282. It is asserted that the requester 280 is conventionally structured with a CPU, storage, a communications adapter for communicating with the serving machine 282, and a user interface for receiving commands from and providing responses to a user. In the storage resides an application program 300, a relational DBMS of the SQL type which includes an SQL application manager 306 and a communications agent 310. In addition, two dictionaries, 342 and 346, are stored which include machine descriptors (dictionary 342) and system-level descriptors (dictionary 346).

The serving machine 282 can comprise a conventionally-programmed System/370 mainframe computer with an SQL-type DBMS 334. An SQL application manager 318 interfaces a communication agent 314 with the DBMS 334. Two dictionaries 322 and 326 am provided for storing system-level descriptors (dictionary 322) and machine-level descriptors (dictionary 326).

The process of FIG. 5 is initiated when the application program 300 issues a database management request. For example, the request can be an SQL statement OPEN. This request results in a call 304 to the application manager 306. The receiver's application manager 306 first has to establish a connection with the desired database management system on the serving machine. This is accomplished by constructing a REQUEST-CONNECTION command in accordance with FIG. 5, with parameter values which describe itself (machine and code page designations) and the level of DBMS services desired (in this case, SQLAM3), as well as parameters (not shown) which identify the serving DBMS. This command is passed at 308 to the communications agent 310 which is responsible for establishing the communication link with the identified serving machine. The REQUEST-CONNECTION command is sent over a conventional communications link 312 to the communications agent 314 responsible for the other end of the communication channel. The agent 314 examines the DBMS parameter (FIG. 5) to determine which level of server SQL application manager to invoke. Once the determination and invocation is completed, the agent 314 forwards at 316 the request to the invoked SQL application manager 318. The manager 318 accesses at 320 the DBMS level dictionary 322 to obtain a descriptor which matches the receiver's desired level of function. (In the preferred implementation, the content of this descriptor is known early in the development cycle and for processing efficiency is "built into" the application manager 318.) Similarly, the manager 318 accesses at 324 the identified machine level descriptor frown the dictionary 326. This includes descriptors matching the machine designated in the MACH parameter of the REQUEST-CONNECTION command and a code page identified in the CODE PAGE parameter.

Having verified that the receiver's environment can be handled, the application manager 318 constructs a COMPLETE-CONNECTION command as illustrated in FIG. 5. The command states the serving machine's characteristics in the MACH code page parameters and the level of system function which the serving machine will support in the DBMS parameter. It is contemplated in the invention that the connection steps may repeat in order to support negotiation to a different system level than that originally requested. Next, the COMPLETE-CONNECTION response is returned to the requesting machine 280 by sending it on 328 to the agent 314 which communicates it on the communication link 312 to the receiver agent 310. The receiver agent 310 sends the COMPLETE-CONNECTION command and parameters at 330 to the application manager 306. In a manner similar to the manager 318, the manager 306 accesses the system and machine-level descriptors which describe the server machine and system characteristics from the dictionaries 342 and 346. Having validated that connection has been established, and having obtained the machine- and system-level descriptors at both ends of the connection, processing continues. The requester's application manager 306 constructs a REQUEST-DATA command corresponding to the OPEN request from the application program 300. This may include an optimal input data descriptor and input data. This command is sent to the server's application manager 318 via 308, 310, 312, 314 and 316. The application manager 318 recognizes a "first request", processes any input data descriptor, converts any input data, and issues an OPEN command 332 to the local DBMS 334, which returns the status in the form of an SQL communication area 336. Next, the manager 318 issues a request on 332 to determine the format of the answer set. The DBMS 334 builds an SQL data area describing the rows which will be returned. This data area is returned on 336 to the server application manager 318 which constructs the user data descriptor for the data. Assuming that data is buffered into the manager 318 and that there is room in the buffer, the server's application manager 318 issues an SQL FETCH request on 332 to the DBMS 334 which returns a first row of data on 336. (It is assumed that the data to be returned corresponds to the user data 20 in FIGS. 1A and 4B.) Next, the server application manager 318 places the data in a reply buffer and issues a PROVIDE-DATA command to send the data to the requester's application manager 306 via 328, 314, 312, 310, and 330. It is contemplated, but not required, that the server's application manager 318 may read ahead to fill buffers in anticipation of the next REQUEST-DATA command.

Upon receiving data with the first PROVIDE-DATA command, the receiver's application manager 306 processes the user data descriptor to verify correctness and to prepare to convert data subsequently received. Assuming no errors are found, the application manager 306 then sends the result of the OPEN back to the application program 300 on 338. From now on, the receiver's application manager 306 may, but is not required to, read ahead requesting additional buffers frown the server's application manager 318 in anticipation of FETCH requests.

Having successfully opened a Cursor, the application program 300 issues an SQL FETCH which is processed by the receiver's application manager 306. At this time, the receiver's application manager 306 has a row of data to return, and converts the data and returns it on 338 to the application program 300. The application 300 processes the data and SQL communication area received and subsequently issues another FETCH command on 304 to obtain another row of data. The requester's application manager 306 having no data to satisfy this request sends another REQUEST-DATA command to the server's application manager 318 via 308, 310, 312, 314, and 316. The server's application manager 318 having read ahead, has a buffer containing the last two rows of data. These rows are sent with the PROVIDE-DATA command to the requester's application manager 306 via 328, 314, 312, 310, and 330. The application manager 306 then converts the first row of the buffer using the previously constructed conversion descriptors and passes it on 338 to the application 300.

To complete the example, the application 300 issues another SQL FETCH request on 304 to request the last row of the answer set. The receiver's application manager 306 converts this last row of data and returns it to the application.

In this example, end-of-query is understood by the application by content of the result achieved. Additional FETCH requests would be required as would an SQL communication area indicating end-of-query, which would have been constructed to allow the DBMS 334 to signal this condition to the application. However, this is beyond the scope of this invention and is not discussed.

Figure 7:
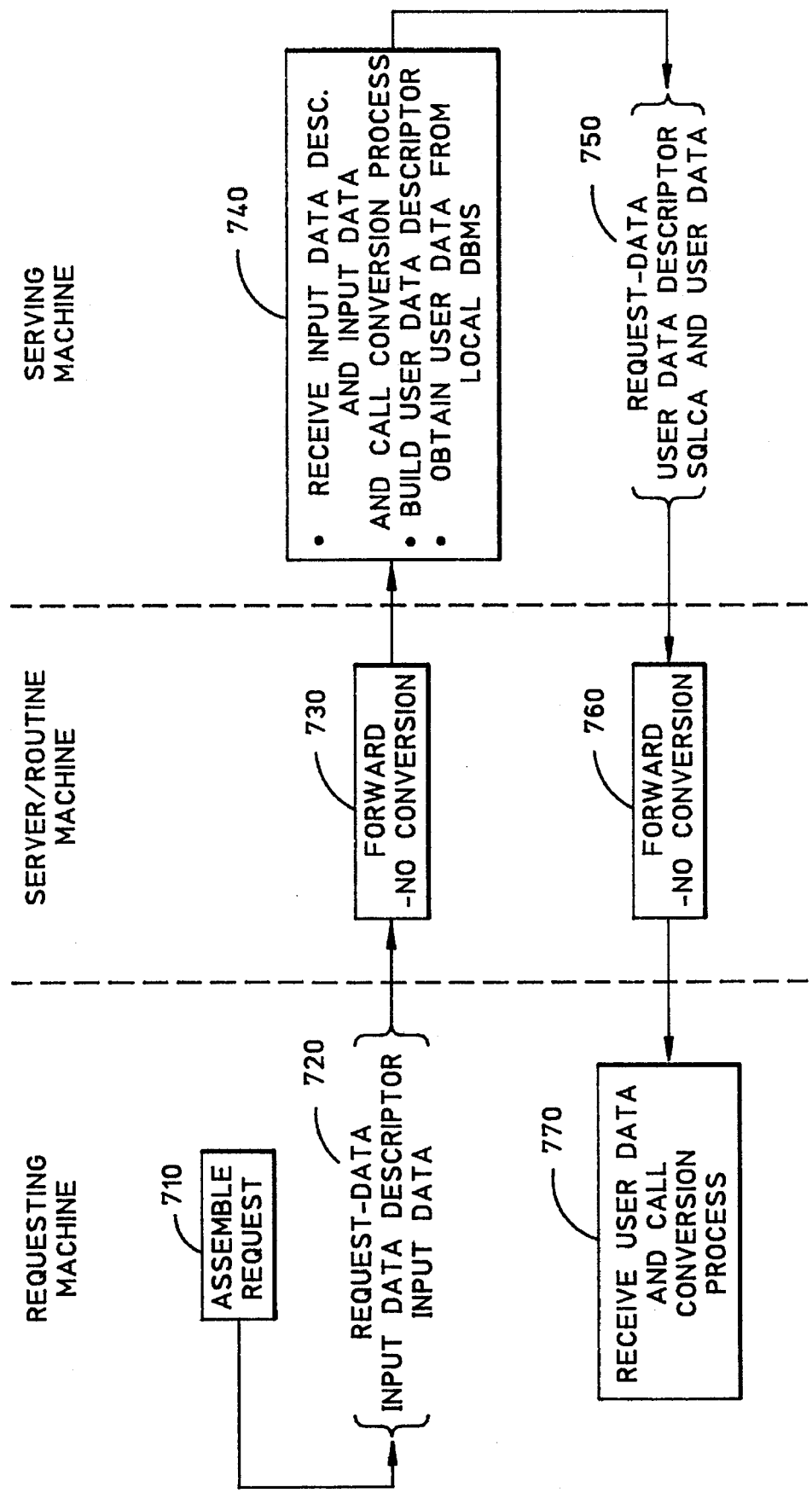
FIG. 7 illustrates the procedure of the invention in the example of command and data flows between a requesting and serving machine passing through an intermediate DBMS system.

FIG. 7 illustrates the benefits of the invention in an alternate environment in which a requesting database machine requests data from a serving database machine through an intermediate database server/router. For the purposes of this example, the intermediate server/router machine is not required to perform additional database functions to satisfy the original request. Such function is not, however, precluded by this invention.

It is further assumed for this illustration that a connection has already been established (as illustrated in FIG. 5) between the requesting machine and the server/router machine, and also between the server/router machine and the serving machine.

In step 710, the requesting machine assembles a data request, sending a REQUEST-DATA command 720, including (for this example) an input data descriptor and input data. In 730 the server/hinter machine receives the REQUEST-DATA with the input data descriptor and input data. The server/router machine determines that it does not need to do any processing of the input data for the request, and that the request is to be processed by the serving machine. The server/router machine, therefore, does not do any conversion of the input data. The server/router, assuring that he active machine and system level descriptors correspond to the requesting machine, forwards the REQUEST-DATA command with the input data descriptor and the input data (still in the native format of the requesting machine) to the serving machine for processing.

In step 740, the serving machine receives the REQUEST-DATA command, input data descriptor and input data, and calls the conversion process if necessary.

Notice that, if the native format of the requesting machine is the same as that of the serving machine, no conversion of the input data will be necessary even though the native format of the intermediate server/router machine may be different. Also note that, if the native format of the requesting machine is different than that of the serving machine, only one conversion is performed (at the serving machine) even though the format of the intermediate server/router machine may be different from both the requesting and the serving machine.

The serving machine accesses the local DBMS in order to build the user data description and obtain the user data. A PROVIDE-DATA command 750 containing the user data descriptor, an SQLCA and the user data (in the serving machine's native format) is then sent to the server/router machine.

The server/router machine recognizes that it is not required to do any processing on the user data, and therefore does not do any conversion of the user data. The server/router 760 assures that the active machine and system level descriptors correspond to the serving machine, and forwards the PROVIDE-DATA command with the user data descriptor and user data (still in the native format of the serving machine) to the requesting machine.

In 770, the requesting machine receives the PROVIDE-DATA command with the user data descriptor and user data, calls the conversion process if necessary, and returns the user data to the user.

Again notice that, if the native format of the serving and requesting machines are the same, no conversion of the user data is performed, even if the native format of the intermediate sever/router machine is different. Also notice that if the native format of the serving and requesting machines are different, only one conversion of the user data (at the requesting machine) is performed even if the native format of the intermediate server/router machine is different from both the serving and requesting machines.

A data converter is not illustrated as an element in any of the figures, it being understood, that data format conversion is well-known in the art. For example, U.S. Pat. No. 4,559,614 of Peck et al., assigned to the Assignee of this application, describes in detail how conversion from a first to a second internal code format is accomplished for data transmitted between two dissimilar computer systems. To the extent necessary, this patent is incorporated herein by reference.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A combination for establishing a data conversion context at a first computer system which receives data from a second computer system, wherein the second computer system stores and processes data in a format different than the first computer system, the combination comprising:

(a) descriptors in the first computer system defining machine and language characteristics of a plurality of computer systems;

(b) means for obtaining from said descriptors, first and second descriptors which respectively define machine and language characteristics for said second computer system;

(c) means for receiving data from the second computer system; and (d) means for combining the first and second descriptors with data descriptors in the received data which describe characteristics of data native to the second computer system to produce a context for converting the received data to data which is native to the first computer system.

2. A method for use by a user processor in making data requests to a server processor which stores and processes data in a format different than the user processor, comprising the user processor executed steps of:

storing a dictionary of processor descriptors;

creating a communication link to a server processor by:
communicating to the server processor an identifier denoting the user processor; and
receiving from the server processor an identifier denoting the server processor;

sending a request for data to the server processor in the user processor data format, the request including a descriptor of the user processor data format;

receiving from the server processor data responsive to the request for data, the data being in the server processor data format, and being accompanied by a descriptor of the server processor data format; and using the identifier denoting the server processor and the descriptor of the server processor data format, converting the data to the user processor data format.

3. The method of claim 2, wherein the step of creating a communication link further includes validating the identifier denoting the server processor.

4. The method of claim 2, wherein the identifier denoting the server processor includes identification of a server processor machine descriptor.

5. The method of claim 4, wherein:

the storing step includes storing a plurality of server processor machine descriptors at the user processor;

and the step of converting includes:
obtaining a server processor machine descriptor from the dictionary in response to the identifier denoting the server processor; and
in response to the server processor machine descriptor, converting bit representations in the data received from the server processor to bit representations used by the user processor.

6. The method of claim 2, wherein the identifier denoting the server processor includes identification of a computer language descriptor.

7. The method of claim 6, wherein:

the storing step includes storing a plurality of computer language descriptors in the dictionary; and the step of converting includes:
obtaining a computer language descriptor from the dictionary in response to the identifier denoting the server processor; and
in response to the computer language descriptor, converting control fields in the data received from the server processor to control fields of a computer language used by the user processor.

8. The method of claim 2, wherein the identifier denoting the server processor includes identification of a server processor code page.

9. The method of claim 8, wherein:

the storing step includes storing a plurality of server processor code page descriptors in the dictionary;

and, the step of converting includes:
obtaining a server processor code page descriptor from the dictionary in response to the identifier denoting the server processor; and
in response to the code page descriptor, converting character representations in the data received from the server processor to character representations used by the user processor.

10. The method of claim 8, wherein:

the storing step includes storing a plurality of server processor code page descriptors in the dictionary;

and, the step of converting includes:
obtaining a code page descriptor from the dictionary in response to the identifier denoting the server processor; and
in response to the code page descriptor, converting control function representations in the data received from the server processor to control function representations used by the user processor.

11. A combination for use by a user processor in making data requests to a server processor which stores and processes data in a format different than the user processor, the combination comprising, in the user processor:

means for creating a communication link to a server processor by:
communicating to the server processor an identifier denoting the user processor; and
receiving from the server processor an identifier denoting the server processor;

a dictionary of server processor descriptors;

means for sending a request for data to the server processor on the communication link in the user processor data format, the request including a descriptor of the user processor data format;

means for receiving from the server processor data responsive to the request for data, the data being in the server processor data format and being accompanied by a descriptor of the server processor data format; and means for converting the data to the user processor data format in response to the identifier denoting the server processor and the descriptor of the server processor data format.

12. The combination of claim 11, wherein the means for creating a communication link is further for validating the identifier denoting the server processor.

13. The combination of claim 11, wherein the identifier denoting the server processor includes identification of a server processor machine descriptor.

14. The combination of claim 13, wherein:

the server processor descriptors include a plurality of server processor machine descriptors;

and, the means for converting includes:
means for obtaining a server processor machine descriptor from the dictionary in response to the identifier denoting the server processor; and
means for converting bit representations in the data received from the server processor to bit representations used by the user processor in response to the server processor machine descriptor.

15. The combination of claim 11, wherein the identifier denoting the server processor includes identification of a computer language descriptor.

16. The combination of claim 15, wherein:

the server processor descriptors include a plurality of computer language descriptors;

and, the means for converting includes:

means for obtaining a computer language descriptor from the dictionary in response to the identifier denoting the server processor; and means for converting control fields in the data received from the server processor to control fields of a computer language used by the user processor.

17. The combination of claim 11, wherein the identifier denoting the server processor includes identification of a server processor code page.

18. The combination of claim 17, wherein:

the server processor descriptors include a plurality of server processor code page descriptors;

and, the means for converting includes:

means for obtaining a server processor code page descriptor from the dictionary in response to the identifier denoting the server processor; and means for converting character representations in the data received from the server processor to character representations used by the user processor in response to the code page descriptor.

19. The combination of claim 17, wherein:

the server processor descriptors include a plurality of code page descriptors;

and, the means for converting includes:

means for obtaining a code page descriptor from the dictionary in response to the identifier denoting the server processor; and means for converting control function representations in the data received from the server processor to control function representations used by the user processor in response to the code page descriptor.

\* \* \* \* \*